United States Patent
Bidiville et al.

(12)

(10) Patent No.: US 6,184,870 B1
(45) Date of Patent: Feb. 6, 2001

(54) INTEGRAL BALL CAGE FOR POINTING DEVICE

(75) Inventors: Marc Bidiville, Pully (CH); Kieran Devey, Cork (IE); Denes Karai, Le Sentier (CH)

(73) Assignee: Logitech, Inc., Fremont, CA (US)

( * ) Notice: Under 35 U.S.C. 154(b), the term of this patent shall be extended for 0 days.

(21) Appl. No.: 09/419,677

(22) Filed: Oct. 15, 1999

Related U.S. Application Data

(63) Continuation of application No. 08/855,817, filed on May 12, 1997, which is a continuation of application No. 08/183,897, filed on Jan. 21, 1994, now Pat. No. 5,670,990, which is a continuation of application No. 08/050,723, filed on Apr. 19, 1993, now abandoned, which is a continuation of application No. 07/768,813, filed on Sep. 27, 1991, now abandoned, which is a continuation-in-part of application No. 07/672,093, filed on Mar. 19, 1991, now abandoned.

(51) Int. Cl.[7] ...................................................... G09G 5/08
(52) U.S. Cl. ............................................ 345/164; 345/163
(58) Field of Search .................................... 345/156, 163, 345/164, 165, 167

(56) References Cited

U.S. PATENT DOCUMENTS

| Re. 34,931 | * | 5/1995 | Duchon ................................. 250/221 |
| 4,533,830 | * | 8/1985 | Beauprey .............................. 250/231 |
| 4,623,787 | * | 11/1986 | Kim ...................................... 250/221 |
| 4,754,103 | * | 6/1988 | De Bisschop et al. ................ 178/18 |
| 4,806,917 | * | 2/1989 | Hosogoe .............................. 340/710 |
| 4,951,034 | * | 8/1990 | Mazzone et al. .................... 340/710 |
| 5,252,968 | * | 10/1993 | Donovan .............................. 390/870 |
| 5,281,958 | * | 1/1994 | Ashmun et al. ..................... 345/157 |

* cited by examiner

*Primary Examiner*—Bipin Shalwala
*Assistant Examiner*—David L. Lewis
(74) *Attorney, Agent, or Firm*—Townsend & Townsend and Crew LLP

(57) ABSTRACT

An electronic mouse with an integral ball cage. The ball cage in one embodiment has integrally formed extensions having openings for enclosed shaft encoders and a pressure roller. The shaft encoders are preferably made of a single piece of plastic. The ball cage is preferably formed as part of the lower housing of the mouse.

6 Claims, 7 Drawing Sheets

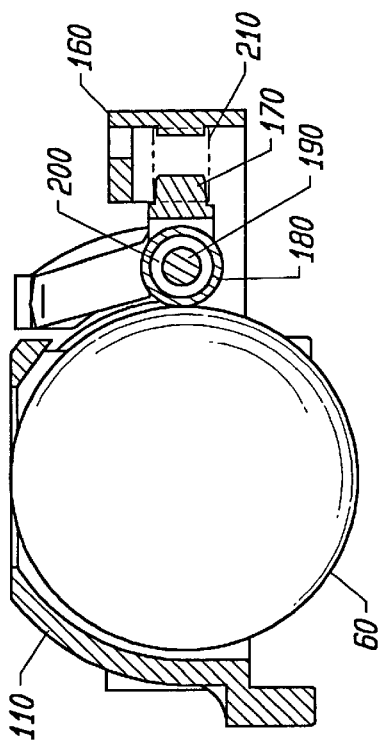
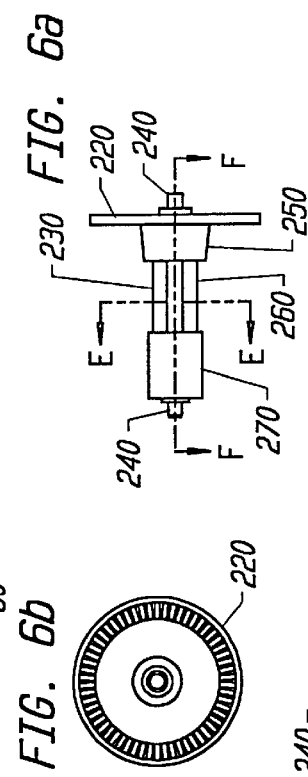
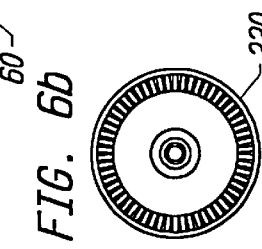
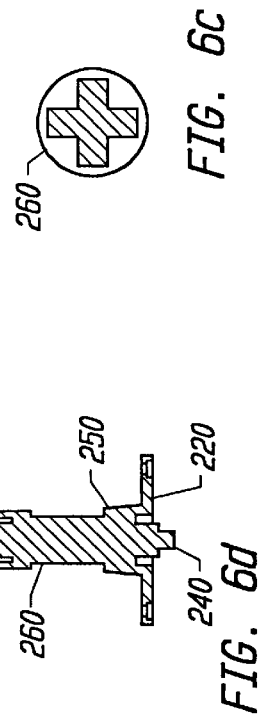
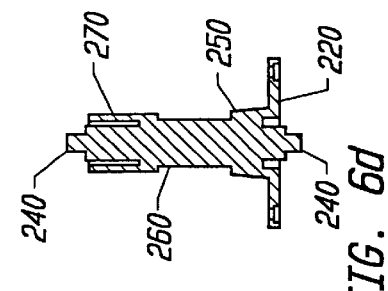
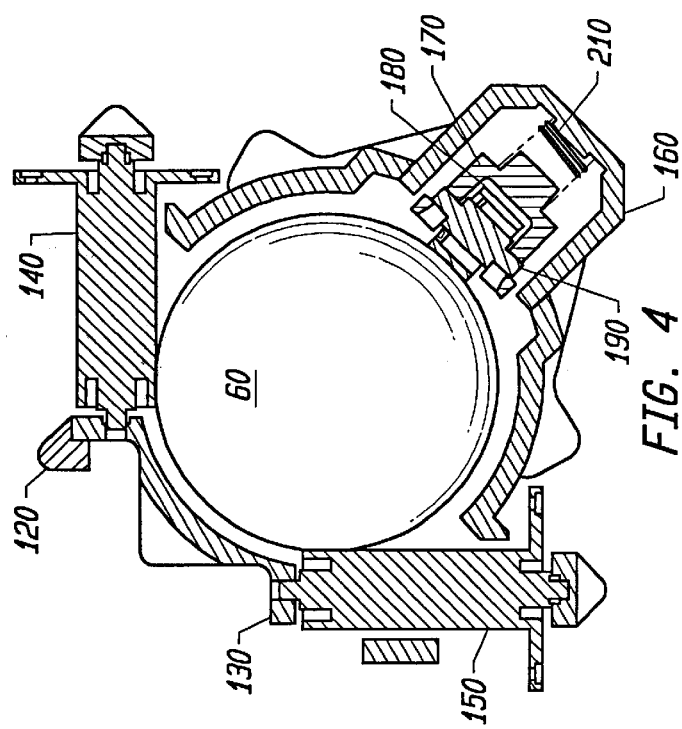
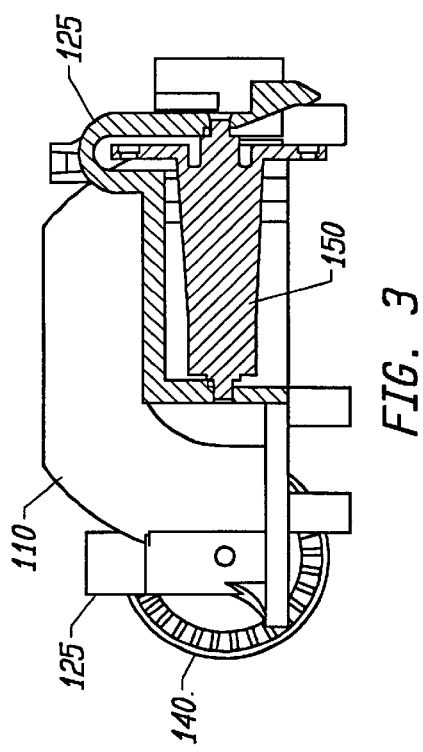

INTEGRAL BALL CAGE FOR POINTING DEVICE

RELATED APPLICATION

This application is a continuation of Ser. No. 08/855,817 filed May 12, 1997, which is a continuation of Ser. No. 08/183,897 filed Jan. 21, 1994 now U.S. Pat. No. 5,670,990, which is a continuation of Ser. No. 08/050,723 filed Apr. 19, 1993 now abandoned, which is a continuation of Ser. No. 07/768,813 filed Sep. 27, 1991 now abandoned, which is a continuation-in-part of Ser. No. 07/672,893 filed Mar. 19, 1991 now abandoned.

FIELD OF THE INVENTION

This application relates to pointing devices such as electronic mice or trackballs, and particularly relates to the ball cage therein and its components.

BACKGROUND OF THE INVENTION

Electronic mice are well known for their advantages as pointing devices. Basically, an electronic mouse converts the linear movement of the mouse over a surface into digital signals to control the cursor of the computer. One common type of electronic mouse uses an optomechanical interface, whereby the movement of a ball drives at least two shaft encoders. The shaft encoders in turn drive an encoding wheel located between a photosource and a photodetector. The movement of the encoding wheel causes pulses of light to reach the photodetector, which creates a pulse train indicative of movement of the mouse.

To provide accurate correlation between the movement of the mouse and movement of the cursor, the ball in an optomechanical mouse must be supported within fairly close tolerances. In substantial part, these close tolerances are necessary to maintain the ball in constant contact with the shaft encoders. In most such mice, a ball cage is provided to maintain the ball in proper position, and the shaft encoders are integrated into the ball cage. In the past, the ball cage has been a complicated assembly comprising in excess of twenty parts, including multiple parts for the shaft encoders and related mechanical elements, a pressure roller to maintain the ball in contact with the shaft encoders, and the ball cage itself. Also, a traction spring with hooks, which is comparatively difficult to assemble, has been required by many prior designs.

Such complicated assemblies increase manufacturing costs and reduce reliability. In addition, prior art designs typically do not lend themselves to use in automatic assembly. There has therefore been a need for a simple ball cage configuration which provides at least equal accuracy while reducing complexity and part count and permitting automatic assembly.

SUMMARY OF THE INVENTION

The present invention substantially overcomes the limitations of the prior art by providing an integral ball cage having only six parts which is capable of automated assembly. In particular, the shaft encoders are formed integrally, as is the pressure roller, and the integrated shaft encoder and pressure roller simply clip into the remainder of the ball cage. Likewise, the optical elements have been simplified to eliminate the need for a mask by building the mask function into the geometry of the photosensor, thereby also reducing part count. Finally, the pressure roller and its shaft are formed integrally, making assembly much simpler. Additionally, the design has been modified to permit use of an inexpensive, simple, and more easily assembled compression coil spring.

Two embodiments, each an improvement over the prior art, are disclosed. In the first embodiment, the ball cage is mounted on the printed circuit board which supports the logic and the optical elements. In a second embodiment, the ball cage can be integrated into the bottom housing rather than being mounted on the printed circuit board, further simplifying assembly and improving reliability, and also allowing the PCB to be reduced in size.

In either embodiment, the resulting ball cage is, by comparison with the prior art, much simpler to manufacture and assemble, thereby improving both yield and reliability. Importantly, the new ball cage is adapted well to automated assembly techniques.

It is one object of the present invention to provide an improved optomechanical mouse in which the ball cage and remaining elements are capable of automatic assembly.

It is another object of the present invention to provide an optomechanical mouse having a highly integrated ball cage.

It is a further object of the present invention to provide a ball cage having a minimal number of moving parts.

It is a still further object of the present invention to provide an optomechanical mouse having a highly integrated ball cage and optical elements which can be assembled by machine.

These and other objects of the invention will be better understood from the following Detailed Description of the Invention, taken together with the appending drawings.

FIGURES

FIG. 2b shows a top left perspective view of the ball cage of FIG. 2a.

FIG. 2c shows a left side elevational view of the ball cage of FIG. 2a.

FIG. 2d shows a front elevational view of the ball cage of FIG. 2a.

FIG. 3 shows a cross-sectional side view of the ball cage of FIG. 2a taken along the lines A—A.

FIG. 4 shows a cross-sectional plan view of the ball cage of FIG. 2d taken along the lines B—B.

FIG. 5 shows a sectional view of the ball cage of FIG. 2a taken along section lines C—C.

FIG. 6a is a side elevational view of a shaft encoder for use in the ball cage of FIG. 2a.

FIG. 6b is an end view of the shaft encoder of FIG. 6a.

FIG. 6c is a cross sectional view of the shaft encoder of FIG. 6a taken along lines E—E.

FIG. 6d is a cross sectional view of the shaft encoder of FIG. 6a taken along the lines F—F.

DETAILED DESCRIPTION OF THE INVENTION

Figure 1:
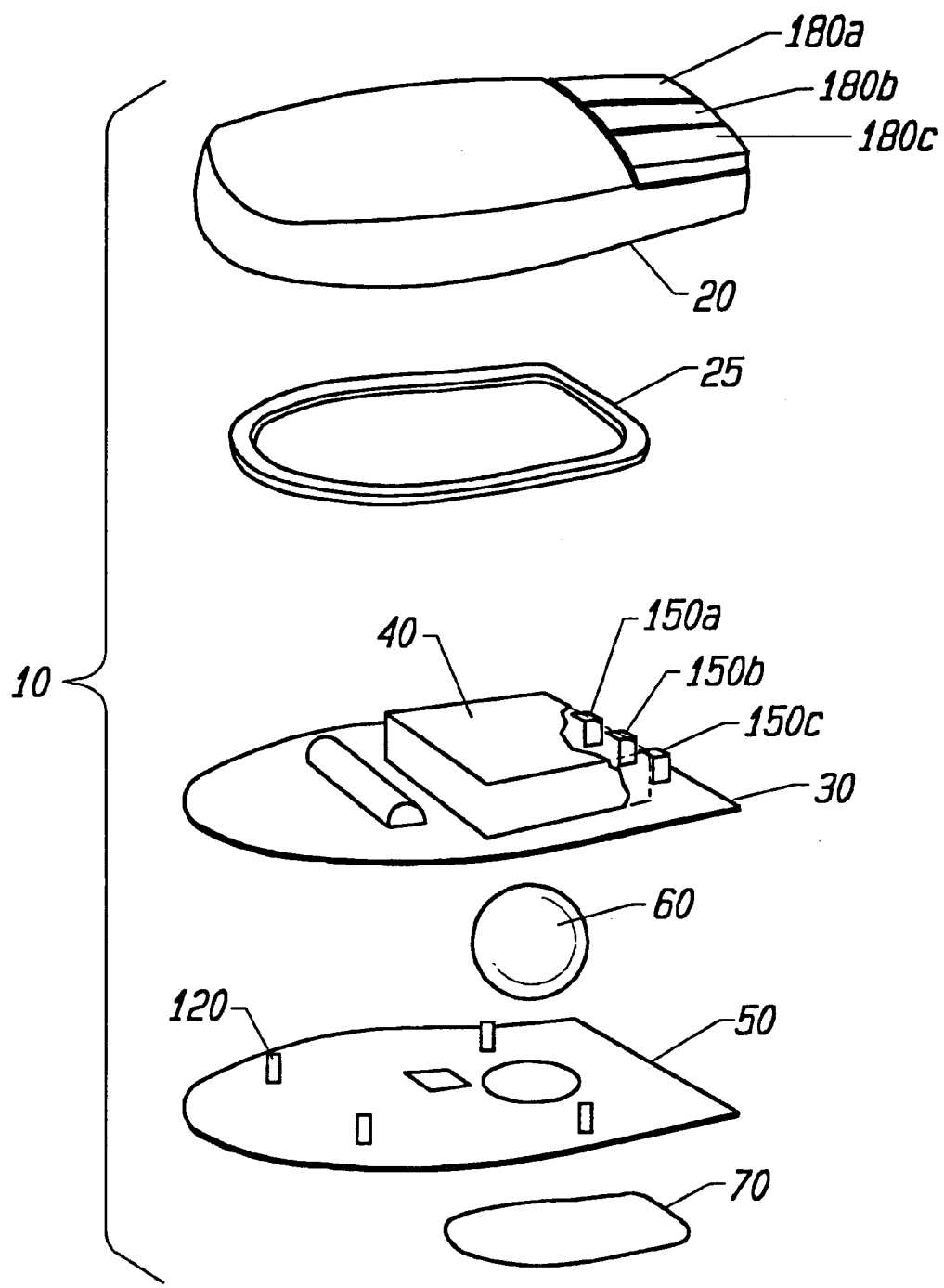
FIG. 1 shows an exploded view of a mouse having a ball cage and optical components according to the present invention.

Referring first to FIG. 1, an optomechanical mouse constructed according to one embodiment of the present invention, indicated generally at 10, is shown in exploded view. For simplicity, only a ball cage for an electronic mouse will be shown, although the present invention could be implemented in a trackball without major modification. The mouse 10 includes an upper housing 20, a printed circuit board 30 to which a ball cage 40 is mounted, a lower housing 50, a ball 60, and a belly door 70 which connects into the lower housing for retaining the ball within the ball cage 40. Alternatively, and as is described in greater detail hereinafter, the ball cage 40 could be mounted to another component, and for example could be formed integrally with the lower housing 50.

The printed circuit board 30 shown in FIG. 1 includes circuitry for converting the analog movement of the ball 60 into digital signals. Depending on whether the mouse is a serial device or a bus board device, the printed circuit board may include either a microprocessor (for the serial configuration) or a simpler logic set (the bus version). The logic on the printed circuit board 30 for the serial version is typically equivalent to that included in a Logitech N-9 serial mouse, while the logic for the bus version is equivalent to that included in a Logitech N-9 bus mouse. Alternatively, the logic may be processor based, such as in Logitech's S2 mouse or Combi mouse. The particular type of logic found on the PCB 30 will depend on the port to which the mouse will be connected.

Referring next to FIGS. 2a–d, the ball cage of the present invention can be better appreciated. Although the ball cage is integrally formed, for purposes of illumination the ball cage will be described as a plurality of separate parts. The ball cage 40 can be seen to include a central ball enclosing section 110 having extensions 120 and 130 extending laterally therefrom. The extension 120 and 130 are positioned orthogonally to one another and provide support for integrated shaft encoders 140 and 150, which are better described in FIG. 6. The ball 60 resides within the central section 110.

Figure 2A:
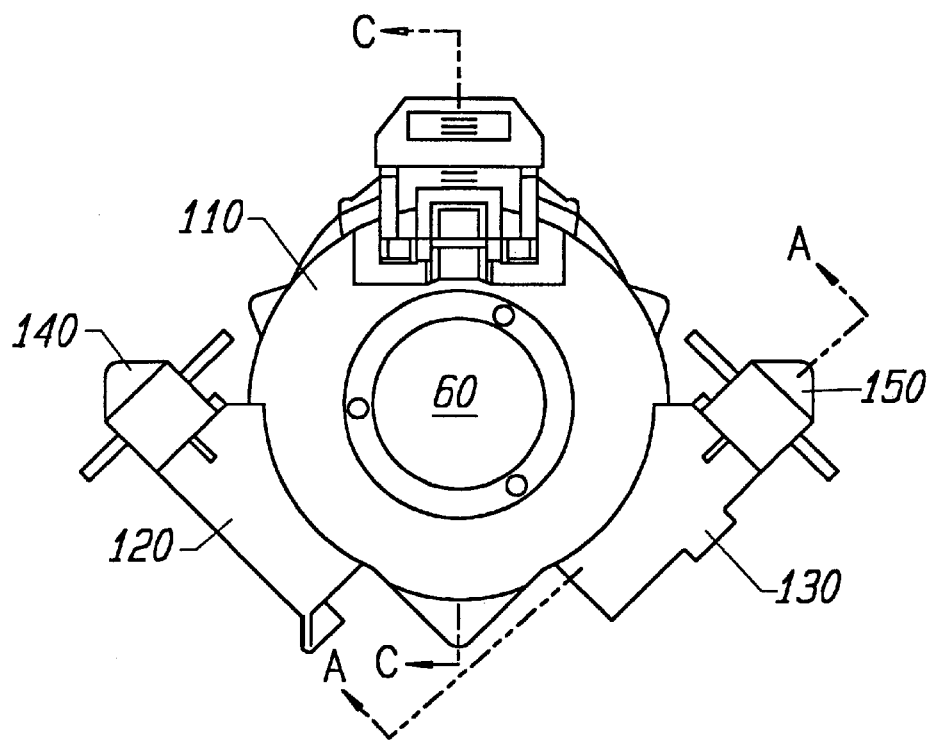
FIG. 2a shows a top plan view of a ball cage according to the present invention.
Figure 2B:
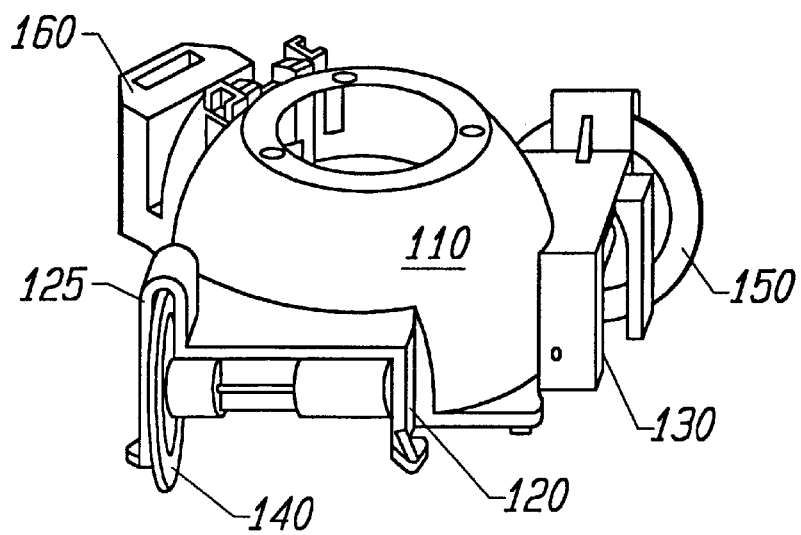
Figure 2D:
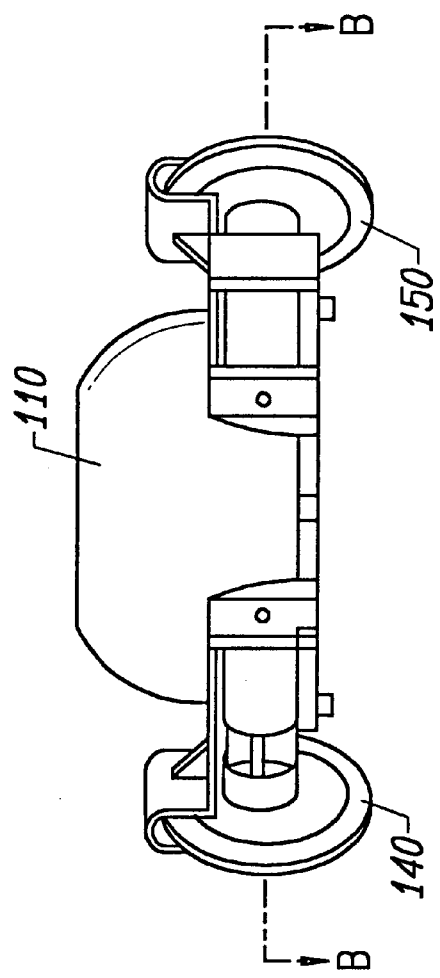
Figure 2C:
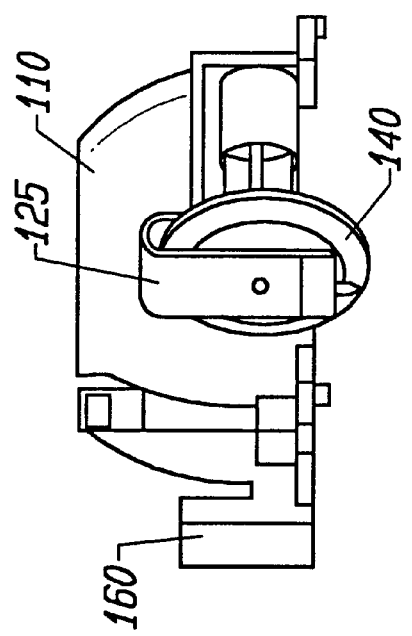

The extensions 120 and 130 may be further appreciated by taking FIG. 4 in conjunction with FIG. 2a. FIG. 4 shows in cross-section the arrangement by which a shaft encoder 140 is mounted into the ball cage extension 120. A similar arrangement is used for the shaft encoder 150 mounted in ball cage extension 130. The extensions 120 and 130 may each be seen to include an upper shroud 125 and to be formed to include spindle supports for receiving the shaft encoders.

The central ball enclosing section 110 further supports an integrally formed pressure roller housing 160, also seen in cross-sectional view in FIGS. 3 and 5. A pressure roller fork 170, formed independently from the housing 110, is suspended from an upper portion of the pressure roller housing 160, and in turn supports a pressure roller 180. The pressure roller 180 includes a pair of spindles 190 which extend into holes or slots 200 in the fork 170, best seen in the sectional view of FIG. 5. It can be seen that the spindles 190 eliminate the need for a shaft through the pressure roller, and thus substantially simplify assembly of the pressure roller in the pressure roller fork. The pressure roller fork 170, and in turn the pressure roller itself, is urged into engagement with the ball 60 by means of a spring 210 which extends between an inside portion of the housing 160 and an outside portion of the fork 170. It will be appreciated that the spring 210 operates in compression, which simplifies assembly. The pressure roller thereby maintains the ball 60 in contact with the shaft encoders 140 and 150 to ensure a high level of accuracy in translating movement of the ball 60 into movement of the cursor on the video screen of the associated computer system.

Turning to FIG. 6a–d, the shaft encoders 140 and 150 can be better appreciated. Each shaft encoder includes an integrally formed slotted disk 220, a shaft portion 230 and a pair of spindles 240 which extend into appropriate receiving holes in the extensions 120 and 130. The shaft portion 230 includes a disk support portion 250, a lightweight strengthening portion 260 and a cylindrical portion 270. The portion 260 may be seen from FIG. 6c to have a "+" shaped cross-section in some embodiments to maintain constant wall thickness and prevent deformation, but in at least some embodiments a cylindrical cross section is preferable. The number of slits in the disk 220 can be adjusted according to the desired resolution of the mouse in dots per inch. The arrangement shown is FIG. 6b is appropriate for 400 dpi resolution. From FIG. 6d, the shaft encoder 140 can be seen to be integrally formed, typically of Minlon 11C1 40 BKB 86 polymer, while the ball cage 40 is typically made from DELRIN 500 CL or other suitably stable polymer having a low frictional coefficient.

A key advantage of the present invention is its simplified assembly. The integrated shaft encoders 140 and 150 simply clip into the remainder of the ball cage 40. The pressure roller 180 simply clips into the pressure roller fork 170, and the spring 210 is maintained in compression. As a result, these elements are well adapted to conventional automated assembly techniques, unlike the prior art.

Shown in FIGS. 7, 8A–B and 9A–B is an alternative to the the embodiment of FIGS. 1–6. In particular, the embodiment of FIGS. 7–9A–B further integrates the ball cage into the lower housing, as shown in the exploded perspective view of FIG. 7. It will be appreciated that the housing of this embodiment can vary significantly from the housing of the first embodiment discussed above without altering any aspect of the present invention.

In the arrangement of FIGS. 7–9A–B, the shaft encoders are mounted directly onto the lower housing, and the optical elements are mounted on a printed circuit board containing the other conventional logic. To properly position the PCB over the shaft encoders, the PCB is mounted in an inverted position, and the optical elements fit into retainers on the lower housing. Such an arrangement permits simplified assembly, and again is optimized for automated assembly techniques.

Figure 7:
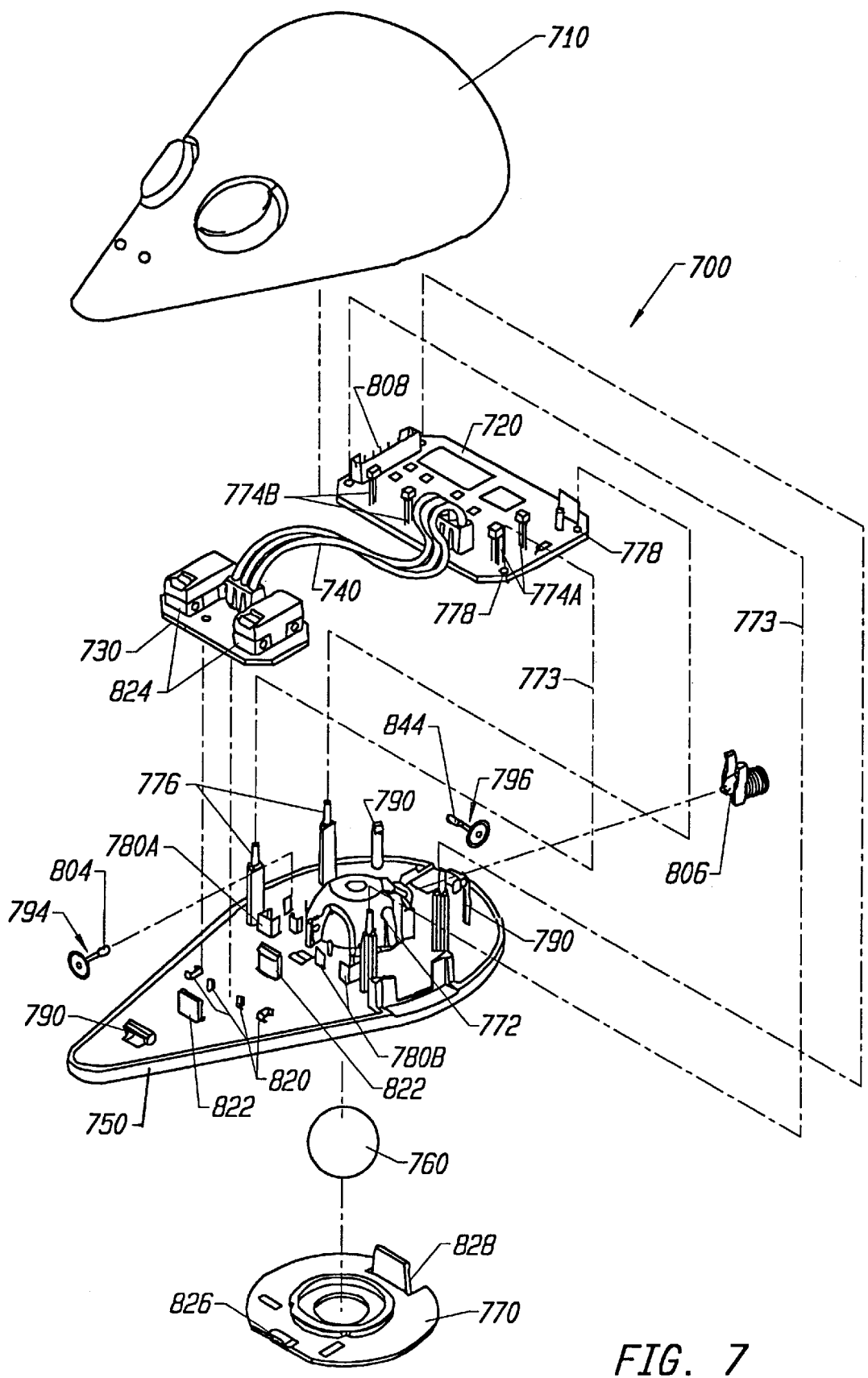
FIG. 7 is an exploded perspective view of a second embodiment of the invention.

In particular, and still referring to FIG. 7, a mouse according to the present invention is indicated at 700, and includes an upper housing 710, a printed circuit board 720, a switch plate 730, a connecting cable 740 extending between the PCB 720 and the plate 730, a lower housing 750, a ball 760 and a belly door 770. During normal operation, the belly door 770 is interlocked with the lower housing 750 to properly position the ball 760 into a ball cage 772 on the housing 750.

For convenience, the PCB 720 is shown in inverted view, with the component side up, whereas in normal operation the PCB 720 is mounted with the component side down as depicted by the phantom lines 773 in FIG. 7. The PCB 720 includes first and second pairs of optical emitters and receivers 774A–B, typically LEDs and phototransistors. When positioned on the lower housing 750, locating pins 776 in the lower housing 750 are inserted through holes 778 on the PCB 720. This positioning also places the optical emitters and receivers 774A–B into enclosure pairs 780A–B, such that each emitter and receiver 774 inserts into an enclosure 780.

The PCB 720 is locked into position on the locating pins 776 by means of the upper housing 710 which includes positioning pins (not shown) on its underside and is locked into position relative to the lower housing by means of retaining clips 790, which mate with corresponding parts on the underside of the upper housing 710. The output of the mouse is provided through a cable connection 808, to which may be connected a conventional multiwire cable.

Referring to FIGS. 8A–B and 9A–B, integrally formed shaft encoders 794 and 796 each insert into retainer pairs 798A–B and 800A–B, adjacent the ball cage 772. The ball cage 772 includes openings therethrough, best seen in FIG. 9A, to permit the pressure roller portions 804 of the shaft encoders 794 and 796 to contact the ball 760. In addition, the ball cage 772 includes an opening 840 (FIG. 8A) for the pressure wheel assembly 806, constructed the same as the pressure wheel assembly in the first embodiment described hereinabove, to contact the ball 760. The back end of the compression coil spring of the pressure wheel assembly 806 seats around a pin 842, and the fork of the pressure wheel assembly 806 is clipped into retainers 844. The switch plate 730 (FIG. 7) is located on spacers 820 and clips into position by means of retaining clips 822. The switch plate 730 includes one or more switches 824 for performing control or data functions as dictated by the software.

Figure 8B:
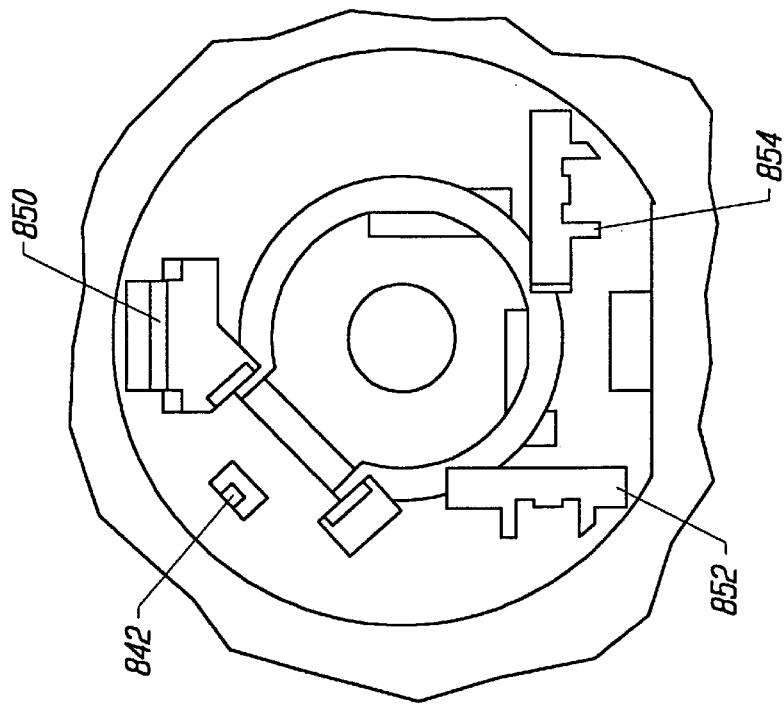
FIG. 8B is a bottom view of the ball cage of the second embodiment.

Referring particularly to FIG. 8B, the belly door clip 828 is retained in place on a flange 850, and openings 852 and 854 are provided through the bottom of the lower housing to ensure clearance for the shaft encoders 794 and 796. The position of the pin 842 can also be seen relative to the remainder of the ball cage 772.

One feature of the embodiment shown in FIGS. 7–9A–B is that it permits extremely small balls to be used. For example, in the embodiment shown, the roller ball 760 can be on the order of 15 mm, and weigh on the order of 9 grams, using a steel core with a rubber coating. This provides substantially the same weight as the ball in the first embodiment discussed above, but with a substantially reduced diameter.

Figure 8A:
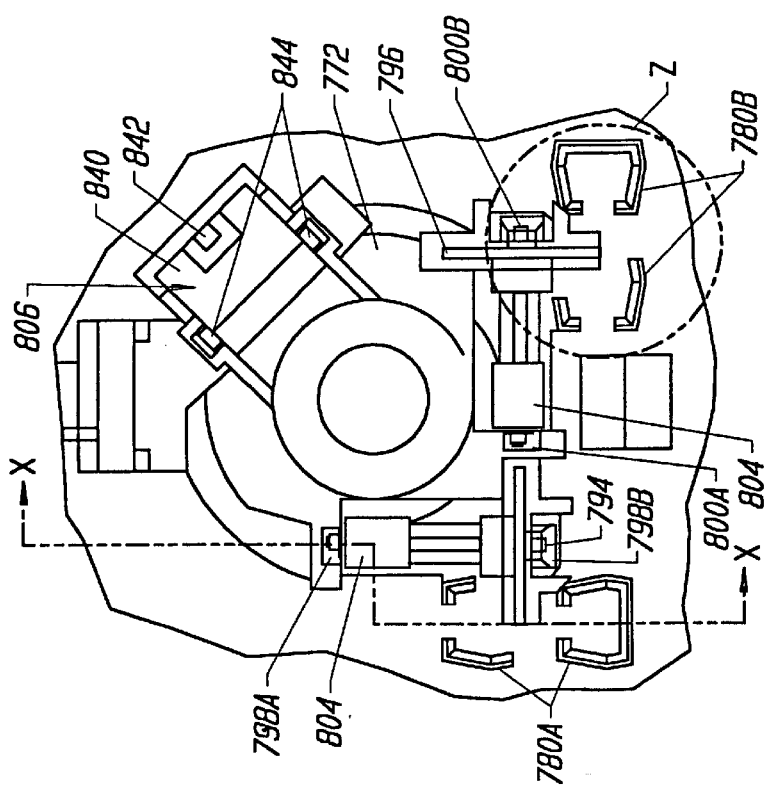
FIG. 8A is a broken top plan of the lower housing, showing the ball cage and optomechanical elements of second embodiment.
Figure 9B:
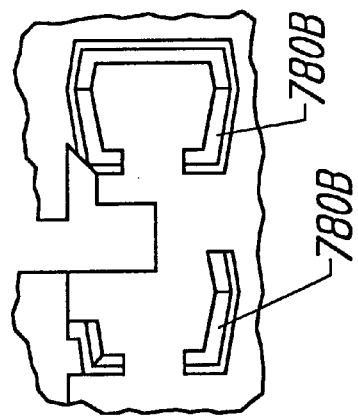
FIG. 9B is a detailed view of the circled portion labeled "Z" in FIG. 8A.
Figure 9A:
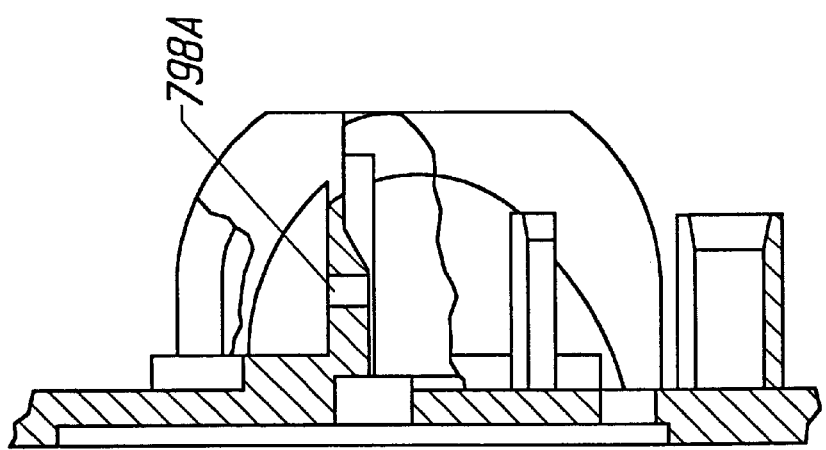
FIG. 9A is a cross-sectional side view of the ball cage of the second embodiment, taken along section lines X—X in FIG. 8A.

Referring particularly to FIG. 9B, which shows in detail the enclosure pair 780B as indicated by the circle labeled "Z" in FIG. 8A, the relative locations of the enclosure pair 780B and the opening 852 for the shaft encoder 796 can be better appreciated. It can be seen from the Figure that one side of the enclosure pair, preferably for the receiver, need not be fully enclosed.

Having fully described a preferred embodiment of the present invention together with alternatives, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. An electronic input device for translating movement of a ball into digital signals for control of a cursor in a personal computer or workstation comprising:

a housing having an opening therethrough;

a ball extending through said opening;

first and second shaft encoders having a shaft and an encoder disk;

first and second pairs of spindle supports, each of said pairs integrally formed with the housing and supporting said shaft encoders;

a printed circuit board mounted on said housing;

at least one optical emitter mounted on said printed circuit board, adjacent one of said encoder disks;

first and second optical receivers mounted on said printed circuit board, each being adjacent one of said encoder disks;

a roller;

a roller support integrally formed with said housing; and the ball being sandwiched between the roller and the shaft encoders to cause the shaft encoders to remain in contact with the ball whenever the ball is moved during operation of the electronic input device.

2. The electronic input device of claim 1 wherein said shaft encoders are each a single piece of plastic.

3. The electronic input device of claim 1 wherein said shaft encoders are clip-mounted into said shaft encoder supports.

4. The electronic input device of claim 1 wherein said shaft encoders each include a pair of spindles, and said shaft encoder supports are spindle supports.

5. The electronic input device of claim 1 wherein said roller includes a pair of spindles, and further comprising a roller support for engaging said spindles.

6. The electronic input device of claim 1 further comprising a spring mounted to bias said roller against said ball.

* * * * *